2,741,550
SOIL STERILIZING PROCEDURE

Robert E. Emond, Mooretown, Ontario, Canada, and James Arnot, deceased, late of Sarnia, Ontario, Canada, by Emily Arnot, executrix, Sarnia, Ontario, Canada, assignors to Esso Research and Engineering Company, a corporation of Delaware No Drawing. Application November 10, 1954,
Serial No. 468,153

8 Claims. (Cl. 71—2.4)

The present invention relates to improved compositions and procedures for the control and destruction of weeds. More specifically, the present invention relates to herbicidal compositions and their application which sterilize the soil against growth of weeds and grasses without creating hazards from fire or soil erosion. Still more specifically the present invention relates to improved methods for the destruction and control of growth of weeds through the use of the aforementioned compositions which may be applied to sloping road allowances, drainage ditches, railway right-of-ways, fire walls, irrigation canals, and other areas where no vegetation is desired.

The present application is a continuation-in-part of Serial No. 383,278, filed September 30, 1953.

Firewalls around refinery tanks and storage depots require continuous maintenance to keep dried weeds and grass from creating a fire hazard as well as detracting from appearance of the plant. In the past, hand labor has been used for removing grass and weeds usually found on such uncultivated areas. This procedure is very costly as it requires a large amount of manpower, and the control is of relatively short duration.

The use of weed killers is well known today. Herbicides such as sodium chlorate, chlorinated phenols, sodium arsenate and ammonium sulfonate have been employed in the past to kill grasses and weeds, but their use entails additional problems such as inflammability, corrosion and toxic hazard to workers in the treated area. The selective nature of the phenoxyacetic acid compounds and the top killing effect of aromatic petroleum fractions have been used for this purpose but give only temporary control. Another method of controlling weed growth is by soil sterilization. Among soil sterilants are creosote, sodium borate, sodium chlorate, and many others. More recently, substituted ureas have been found promising.

An important problem associated in particular with this more effective soil sterilants is the fact that, due to the killing of the weeds and consequent removal of a ground cover, the soil particles are no longer bound together and consequent erosion from wind and rain becomes a serious matter. Particularly when soils having high clay content are treated with soil sterilants, the absence of vegetation allows the soil to dry out and crack readily. Thus, with the ensuing rains, the soil sterilizing compounds are leached into the lower soil strata and thus lose their effectiveness, for it has been demonstrated that the majority of troublesome weed seeds germinate from the top one-inch soil layer.

It has now been found that excellent soil sterilizing effects may be obtained when there is employed as a soil sterilizing agent the hydrated crystals (pentahydrate or decahydrate of sodium tetraborate) or an aqueous solution of borax, followed by an application of an aromatic cracked gas oil or a cut-back asphalt oil. Neither the borax alone, nor the application of the oil alone gives any degree of soil sterility on a heavy clay soil. The combination, however, gives an excellent soil sterilizing action. The possible reason for such an unexpected effect is that leaching of the sodium borate to the lower soil horizons is prevented by the gas oil or liquid asphalt layer, and hence germinating seeds are unable to overcome the toxic concentrations of sodium borate. However, as shown below, this combination of an aromatic oil or asphalt oil and other water soluble salts employed as soil sterilizing agents, such as the sodium salt of trichloracetic acid, does not give an enhanced effect.

In accordance with the present invention the borax may be applied in two ways. (1) an aqueous solution of borax is sprayed upon the area to be sterilized. The solution contains the active ingredient to the extent of 10 to 200% by weight. (Solubility of borax=201 gms. per 100 gms. of hot water at 100° C.). The application is carried out such that about 2 to 20 lbs. of sodium borate (or borax) is used per 100 square feet or about 800 to 8000 lbs. per acre. A spray machine may be employed for this purpose.

(2) The borax may also be applied as a dry solid from a fertilizer spreader. This borax may vary in concentration of sodium borate from 50% to 100% by weight but generally a concentration of 89% sodium borate is used in this service. The application is carried out such that eight hundred (800) to eight thousand (8000) pounds of sodium borate is used per acre.

Following the borax there is applied to the same terrain, in one embodiment of the invention, a light catalytic cracked gas oil fraction, boiling in the range of from about 400°–650° F. having a substantial aromatic content. This is sprayed to the extent of 20 to 2000 gallons per acre. A high rate of 2000 gallons would be used on rough terrain to give a very thick oil coating. Instead of the aromatic oil, however, it may be desirable to employ a cut-back asphalt oil. One such type is an oil having a Saybolt furol viscosity of 8–100 seconds at 77° F., prepared by blending a 120/150 penetration asphalt with a naphtha having a minimum initial boiling point of about 170° F. The asphalt film formed assists in controlling soil erosion, prevents reseeding wind-carried weed seeds and binds the stones together to give a more stable surface area.

A series of plots were laid out on a fertile heavy clay loam which, in its undisturbed state, supported a lush growth of grass and weeds. In one check plot, 565 weed plants and 72 grass plants per square foot were counted.

The soil sterilizing activities of a number of formulations were investigated. Each was sprayed on three 100 square foot (10′ x 10′) plots in May and June, respectively. In September of the following year, i. e. 15–16 months later, the established plots were assessed according to the percentage of green vegetation, and these results are shown in the table.

TABLE
Control of vegetation with soil sterilants

| Treatment | Rate (per 100 sq. ft.) | Time of Application | Percent Control of Vegetation 15–16 mos. after application |
|---|---|---|---|
| 1. Heavy Catalytic Cracked Gas Oil, 600°–800° F. Distillation. | ¾ pint | May | 0 |
|  |  | June | 0 |
| 2. Light Catalytic Cracked Gas Oil, 400–650° F. Distillation. | ¾ pint | May | 0 |
|  |  | June | 0 |
| 3. Paris Green, Copper acetometarsenite. | 2 lbs | May | 0 |
|  |  | June | 0 |
| 4. Paris Green, Copper acetometarsenite followed by gas oil. | 2 lbs | May | 0 |
|  |  | June | 0 |
| 5. Sodium trichloroacetate (T. C. A.). | 1 lb | May | 0 |
|  |  | June | 25 |
| 6. T. C. A. followed by gas oil | 1 lb., ¾ pint | May | 25 |
|  |  | June | 25 |
| 7. Borax (Sodium Borate) | 4 lbs | May | 10 |
|  |  | June | 0 |
| 8. Sodium Borate (Borax) followed by gas oil. | 4 lbs., ¾ pint | May | 95 |
|  |  | June | 60 |
| 9. Check | | May | 0 |
|  |  | June | 0 |

The results show the following:
1. Heavy catalytic cracked gas oil (600–700° F. distillation range) at 20 gallons per acre (¾ pint per 100 square feet) showed no prolonged soil sterilizing effects.
2. Light catalytic cracked gas oil (400–650° F. distillation range) at 20 gallons per acre killed only small weeds and suppressed the growth of well established grasses, hence three or more applications would be required during the season for eradication. This proved no better than the above for this purpose.
3. Paris green (copper acetometarsenite) has been reported as a satisfactory soil sterilant; however, no weed killing effects were noticed when this material was applied at 870 pounds per acre (2 pounds per 100 square feet) alone or if followed by applications of the aromatic light catalytic gas oil.
4. T. C. A. (sodium salt of trichloracetic acid) at 435 pounds per acre (1 pound per 100 square feet) gave unsatisfactory control when applied in May. Only slightly better results were obtained with applications particularly if followed by the oil spray.
5. Borax (sodium borate) at 1700 pounds per acre (4 pounds per 100 square feet) applied as an aqueous solution produced little effect. However, if this treatment is followed by an application of an aromatic oil at 20 gallons per acre, all the growth is virtually controlled.
6. A cutback asphalt at 1,500 gallons per acre (2.3 gallons per 100 square feet) gave no better control of vegetation than aromatic oils. Recent large scale applications have shown it to be quite desirable as a "follow-up" spray for the soil sterilizing solution.

These data show that heavy clay soil may be sterilized not only by adding organic chemicals in asphalt oils, such as 3-p-chlorophenyl 1,1 dimethyl urea as disclosed in copending application Serial No. 383,278, but also by application of the fire retarding chemical sodium borate or borax, followed by an aromatic cracked gas oil or a liquid asphalt. Particularly, when employed in sterilizing stoned industrial areas, the advantage of the present operation is not only in greatly reducing the fire hazard of the area by freeing it from dry flammable vegetation, but also in providing a fire retardant compound on the soil surface.

Since the rate at which borax alone must be applied to give soil sterilizing effects is of the order of 3500–5000 lbs. minimum per acre, or 8–14 lbs./100 square feet, the use of this very large quantity of material is almost prohibitive due to transportation costs alone. However, where this same compound is applied at half the rate, or 4 lbs./100 square feet, and this is followed with the oil spray to obtain the persistent soil sterilizing effects, as shown in the data, a noteworthy savings is realized.

As pointed out, the procedure of the present invention may be advantageously followed where applications of dry borax have been made; i. e., the dry borax may be applied by means of a fertilizer spreader at a specified rate, such as 4 lbs./100 square feet, or 1740 lbs. per acre, and followed by the oil at ¾ pint per 100 square feet, or 20 gallons/acre. This application has found great utility in preventing weed growth on industrial (stoned) areas. Thus, dry borax applications have been made at a large northern petroleum refinery using fertilizer spreaders during the spring break-up. At this time, heavy trucks were unable to ply the driveways. Later in the season the roadway became passable and the asphalt spray was applied.

In still another embodiment of the present invention, the borax or sodium tetraborate is incorporated directly in the aromatic oil or bituminous material to produce an improved soil sterilant that may be readily manufactured in an asphalt blending plant for spraying on areas where no vegetation is desired. Experiments as below show that blends may be prepared which are stable even on the addition of water.

*Experiment 1.*—Sodium borate decahydrate (4 grams) was blended with 40 grams of 85/100 penetration asphalt. Heat was applied so that the temperature of the mix was 450° F. for 30 minutes. At a temperature of 250° F. (approx.) effervescing took place. This may have been loss of water of hydration from the borax. At the end of the heating period water was added. It was observed that the bitumen-borax blend adsorbed 15 grams of water. This blend did not separate on cooling.

*Experiment 2.*—A further experiment using a formula consisting of asphalt (5 parts), borax (1 part), molasses (1 part), has been conducted, the purpose of the use of the latter being to improve the fluidity of the blend. The addition of the molasses also permits the amount of water added to be increased.

What is claimed is:
1. A method of sterilizing soils which comprises applying to said soils sodium borate and an oil selected from the class of aromatic cracked gas oils and cutback asphalt oil, in amounts sufficient to sterilize said soil for a prolonged period of time.
2. A method of sterilizing soils which comprises applying to said soils an aqueous solution of sodium borate followed by an oil selected from the class of aromatic cracked gas oils and cutback asphalt oil, in amounts sufficient to sterilize said soil for a prolonged period of time.
3. The process of claim 2 wherein said gas oil boils in the range of about 400–650° F.
4. The process of claim 2 wherein said asphalt oil has a Saybolt furol viscosity of 8–100 secs. @ 77° F.
5. The process of claim 2 wherein said aqueous solution of sodium borate contains 10–20% by weight of said salt.
6. The process of claim 2 wherein said salt is applied to said soil at the rate of 800–8000 lbs. per acre and said oil at the rate of 20–2000 gallons per acre.
7. A method of sterilizing soils which comprises applying to said soils dry sodium borate followed by an oil selected from the class of aromatic cracked gas oils and cutback asphalt oils, in amounts sufficient to sterilize said soil for a prolonged period of time.
8. The process of claim 7 wherein said dry salt is applied at the rate of 800–8000 lbs. per acre and said oil at the rate of 20–2000 gallons per acre.

No references cited.